United States Patent

Hsieh et al.

(10) Patent No.: US 10,529,081 B2
(45) Date of Patent: *Jan. 7, 2020

(54) DEPTH IMAGE PROCESSING METHOD AND DEPTH IMAGE PROCESSING SYSTEM

(71) Applicant: Wistron Corporation, New Taipei (TW)

(72) Inventors: Sheng-Shien Hsieh, New Taipei (TW); Kai-Chung Cheng, New Taipei (TW); Yu-Wen Huang, New Taipei (TW); Tzu-Yao Lin, New Taipei (TW); Pin-Hong Liou, New Taipei (TW)

(73) Assignee: Wistron Corporation, New Taipei (TW)

( * ) Notice: Subject to any disclaimer, the term of this patent is extended or adjusted under 35 U.S.C. 154(b) by 161 days.

This patent is subject to a terminal disclaimer.

(21) Appl. No.: 15/869,106

(22) Filed: Jan. 12, 2018

(65) Prior Publication Data

US 2018/0137636 A1 May 17, 2018

Related U.S. Application Data

(63) Continuation of application No. 15/093,767, filed on Apr. 8, 2016, now Pat. No. 9,905,023.

(30) Foreign Application Priority Data

Dec. 28, 2015 (TW) .............................. 104144098 A

(51) Int. Cl.
G06T 7/507 (2017.01)
G06T 7/593 (2017.01)
G06T 7/50 (2017.01)
G06T 7/80 (2017.01)

(52) U.S. Cl.
CPC ................ *G06T 7/507* (2017.01); *G06T 7/50* (2017.01); *G06T 7/593* (2017.01); *G06T 7/85* (2017.01); *G06T 2207/10012* (2013.01); *G06T 2207/20016* (2013.01); *G06T 2207/20228* (2013.01)

(58) Field of Classification Search
CPC ........... G06T 2207/10021; G06T 7/593; G06T 2207/20228; G06T 2207/10028; H04N 13/0022; H04N 13/0271
See application file for complete search history.

(56) References Cited

U.S. PATENT DOCUMENTS

| 8,045,792 | B2* | 10/2011 | Koo | .......................... G06T 7/97 |
| | | | | 382/154 |
| 9,565,415 | B2* | 2/2017 | Zhang | ..................... G06T 19/20 |
| 9,766,708 | B2* | 9/2017 | Hsieh | ...................... G06F 3/017 |
| 2010/0225745 | A1* | 9/2010 | Chen | .................. H04N 5/23258 |
| | | | | 348/49 |

(Continued)

*Primary Examiner* — Utpal D Shah
(74) *Attorney, Agent, or Firm* — JCIPRNET

(57) ABSTRACT

A depth image processing method and a depth image processing system are provided. The depth image processing method includes: capturing a first image and a second image; performing a feature comparison to acquire a plurality of feature pairs between the first image and the second image, wherein each of the feature pairs includes a feature in the first image and a corresponding feature in the second image; computing disparities of the feature pairs; computing a depth image through the first image and the second image when the disparities of the feature pairs are all smaller than a disparity threshold.

20 Claims, 5 Drawing Sheets

(56) References Cited

U.S. PATENT DOCUMENTS

| | | | |
|---|---|---|---|
| 2011/0044502 A1* | 2/2011 | Liu | G06T 7/174 |
| | | | 382/103 |
| 2013/0027391 A1* | 1/2013 | Lin | H04N 13/106 |
| | | | 345/419 |
| 2013/0321580 A1* | 12/2013 | Chou | H04N 13/271 |
| | | | 348/46 |
| 2015/0170370 A1* | 6/2015 | Ukil | G09G 5/377 |
| | | | 382/154 |
| 2015/0237329 A1* | 8/2015 | Venkataraman | G06T 7/55 |
| | | | 348/48 |
| 2015/0269737 A1* | 9/2015 | Lam | H04N 13/128 |
| | | | 382/154 |
| 2017/0041585 A1* | 2/2017 | Liu | H04N 13/271 |
| 2017/0084014 A1* | 3/2017 | Moon | G06K 9/00208 |

* cited by examiner

DEPTH IMAGE PROCESSING METHOD AND DEPTH IMAGE PROCESSING SYSTEM

CROSS-REFERENCE TO RELATED APPLICATION

This application is a continuation application of and claims the priority benefit of a prior application Ser. No. 15/093,767, filed on Apr. 8, 2016, now allowed. The prior application Ser. No. 15/093,767 claims the priority benefit of Taiwan application serial no. 104144098, filed on Dec. 28, 2015. The entirety of each of the above-mentioned patent applications is hereby incorporated by reference herein and made a part of this specification.

BACKGROUND OF THE INVENTION

Field of the Invention

The invention relates to an image processing method and an image processing system, and particularly relates to a depth image processing method and a depth image processing system.

Description of Related Art

In recent years, along with improvement of user experience requirements, a depth image technique becomes popular. A method for calculating a depth image includes using a structured light, a time of flight (TOF) method, a stereo matching method, etc. The stereo matching method is to take one of a left image and a right image as a reference, and look for an offset in another image. For example, a frame of a height of the left image is taken as a reference, the frame of the same height in the right image is shifted by one pixel each time from the leftmost to the rightmost to compare images in the frames one-by-one, so as to find the features with the highest similarity from the comparison results to obtain the offset of the left image frame and the right image frame, and then calculate a depth image according to the offset of the image frames.

Since the aforementioned method is required to move the frame from the leftmost of the image to the rightmost, hundreds or thousands of computations have to be performed in order to obtain one offset, which leads to a poor efficiency. Therefore, a method of first down scaling an image resolution and then calculating depth is provided, for example, an image resolution of 800*600 is first down scaled to 400*300 and then a depth value is calculated. Although the above method may decrease a computation amount, it may increase an error of the offset of a far-distance object, and result in a fact that a depth value of the far-distance object in the depth image cannot be identified.

Moreover, in a digital camera, if a distance of the captured object is too close, a disparity of the left image and the right image is large, such that the system has to spend more time to calculate a depth image, and a user has to wait for a long time on the depth image calculation, which decreases a user's experience. Therefore, it is a goal of effort for related technicians of the field to identify a depth value of the far-distance object under a premise of decreasing the computation amount of the depth value, and automatically determine not to calculate the depth image when the captured object is too close to decrease the waiting time of the user.

SUMMARY OF THE INVENTION

The invention is directed to a depth image processing method and a depth image processing system, by which a computing time of a depth image is decreased, details of a far-distance object are retained, and a user is avoided to waste a long time to wait for producing a depth image with fractured object due to a too close distance of a captured object.

An exemplary embodiment of the invention provides a depth image processing method including following steps. A first image and a second image are captured. A feature comparison is performed to obtain a plurality of feature pairs between the first image and the second image, where each of the feature pairs includes a feature in the first image and a corresponding feature in the second image. Disparities of the feature pairs are computed. A depth image is computed through the first image and the second image when the disparities of the feature pairs are all smaller than a disparity threshold.

In an exemplary embodiment of the invention, the feature pairs are obtained from at least one region of interest corresponding to the first image and the second image.

In an exemplary embodiment of the invention, the depth image processing method further includes computing a third image corresponding to the first image and a fourth image corresponding to the second image, where the first image and the second image have a first resolution, the third image and the fourth image have a second resolution, and the second resolution is smaller than the first resolution.

In an exemplary embodiment of the invention, the depth image processing method further includes performing the feature comparison on the third image and the fourth image to obtain a first depth image, where the first depth image includes a near-distance feature and a far-distance feature, where a disparity of the near-distance feature is greater than a lower limit of comparison times.

In an exemplary embodiment of the invention, the step of performing the feature comparison on the third image and the fourth image to obtain the first depth image includes performing the feature comparison on the third image and the fourth image to obtain a low resolution depth image, and obtaining the first depth image having the first resolution through the low resolution depth image.

In an exemplary embodiment of the invention, the step of performing the feature comparison to obtain the feature pairs between the first image and the second image includes performing the feature comparison within the disparity threshold to obtain the far-distance feature of the first image and the second image, and computing a second depth image through the first image and the second image.

In an exemplary embodiment of the invention, the depth image processing method further includes using the far-distance feature of the second depth image to fill up the far-distance feature of the first depth image when a disparity of the far-distance feature of the first depth image is equal to zero.

In an exemplary embodiment of the invention, the step of performing the feature comparison to obtain the feature pairs between the first image and the second image includes following steps. A plurality of first features of the first image is obtained and a plurality of second features of the second image is obtained. Adding a third feature and a fourth feature to the feature pairs when similarity of the third feature in the first features and the fourth feature in the second features is greater than a similarity threshold. It is determined whether the disparities of the feature pairs are greater than the disparity threshold when the number of the feature pairs is greater than a number threshold. Not to compute the depth image through the first image and the second image and sending a warning signal when the disparity of one of the feature pairs is greater than the disparity threshold.

In an exemplary embodiment of the invention, the depth image processing method further includes computing similarity of the third feature and the fourth feature by comparing a plurality of feature vectors of the third feature and the fourth feature.

In an exemplary embodiment of the invention, the step of capturing the first image and the second image further includes calibrating the first image and the second image to eliminate a rotation difference of a plurality of coordinate axes and a displacement difference of a part of the coordinate axes between the first image and the second image.

An exemplary embodiment of the invention provides a depth image processing system including a camera module and a processing module. The camera module includes a first lens and a second lens, where the first lens is configured to capture a first image and the second lens is configured to capture a second image. The processing module is coupled to the camera module, and performs a feature comparison to obtain a plurality of feature pairs between the first image and the second image, and computes disparities of the feature pairs, and computes a depth image through the first image and the second image when the disparities of the feature pairs are all smaller than a disparity threshold, where each of the feature pairs includes a feature in the first image and a corresponding feature in the second image.

In an exemplary embodiment of the invention, the feature pairs are obtained from at least one region of interest of the first image and the second image.

In an exemplary embodiment of the invention, the processing module computes a third image corresponding to the first image and a fourth image corresponding to the second image, where the first image and the second image have a first resolution, the third image and the fourth image have a second resolution, and the second resolution is smaller than the first resolution.

In an exemplary embodiment of the invention, the processing module performs the feature comparison on the third image and the fourth image to obtain a first depth image, where the first depth image includes a near-distance feature and a far-distance feature, where a disparity of the near-distance feature is greater than a lower limit of comparison times.

In an exemplary embodiment of the invention, the processing module performs the feature comparison on the third image and the fourth image to obtain a low resolution depth image, and obtains the first depth image having the first resolution through the low resolution depth image.

In an exemplary embodiment of the invention, the processing module performs the feature comparison within the disparity threshold to obtain the far-distance feature of the first image and the second image, and computes a second depth image through the first image and the second image.

In an exemplary embodiment of the invention, the processing module uses the far-distance feature of the second depth image to fill up the far-distance feature of the first depth image when a disparity of the far-distance feature of the first depth image is equal to zero.

In an exemplary embodiment of the invention, the processing module obtains a plurality of first features of the first image and a plurality of second features of the second image. When similarity of a third feature in the first features and a fourth feature in the second features is greater than a similarity threshold, the processing module adds the third feature and the fourth feature to the feature pairs. When the number of the feature pairs is greater than a number threshold, the processing module determines whether the disparities of the feature pairs are greater than the disparity threshold. When the disparity of one of the feature pairs is greater than the disparity threshold, the processing module does not compute the depth image through the first image and the second image and sends a warning signal.

In an exemplary embodiment of the invention, the processing module computes similarity of the third feature and the fourth feature by comparing a plurality of feature vectors of the third feature and the fourth feature.

In an exemplary embodiment of the invention, the processing module calibrates the first image and the second image to eliminate a rotation difference of a plurality of coordinate axes and a displacement difference of a part of the coordinate axes between the first image and the second image.

In an exemplary embodiment of the invention, the first lens, the second lens and the processing module are disposed in a depth image processing device.

In an exemplary embodiment of the invention, the first lens and the processing module are disposed in a depth image processing device, and the second lens is disposed in an electronic device, where the depth image processing device is detachably disposed on the electronic device.

According to the above descriptions, the depth image processing method and the depth image processing system of the invention first decrease a resolution of a left image and a right image to obtain the first depth image, obtain the second depth image by using the left image and the right image of the original resolution, and fill up the far-distance object of the second depth image to the first depth image. In this way, a computing time of the depth image is shortened while details of the far-distance object in the depth image are maintained. Moreover, the depth image processing method and the depth image processing system of the invention may further send a warning signal to the user to remind the user that a capturing distance is too close when the disparity of the feature pairs with high similarity is greater than the disparity threshold, such that the user is avoided to waste a long time to wait for producing a depth image with fractured object.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
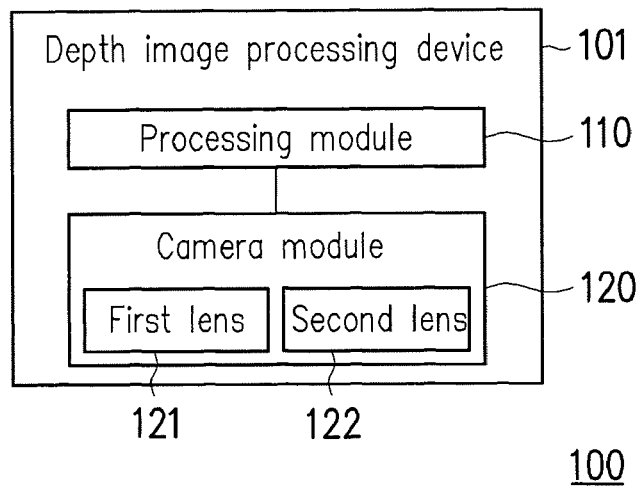
FIG. 1 is a block diagram of a depth image processing system according to an exemplary embodiment of the invention.

FIG. 1 is a block diagram of a depth image processing system according to an exemplary embodiment of the invention. Referring to FIG. 1, the depth image processing system 100 of the exemplary embodiment of the invention is a depth image processing device 101. The depth image processing device 101 is, for example, a digital camera or other image capturing device. The depth image processing device 101 includes a processing module 110 and a camera module 120 coupled to the processing module 110. The processing module 110 is, for example, a microprocessor configured to process image data captured by the camera module 120. The camera module 120 is, for example, a complementary metal-oxide-semiconductor (CMOS) image sensor or a charge-coupled device (CCD) image sensor. The camera module 120 has a first lens 121 and a second lens 122. The first lens 121 and the second lens 122 are disposed on a same horizontal plane for simultaneously capturing a left image and a right image. The processing module 110 may produce a stereo depth image through the left image and the right image. The depth image processing device 101 may further include a storage module (not shown) for storing the left image, the right image and the stereo depth image.

Figure 2:
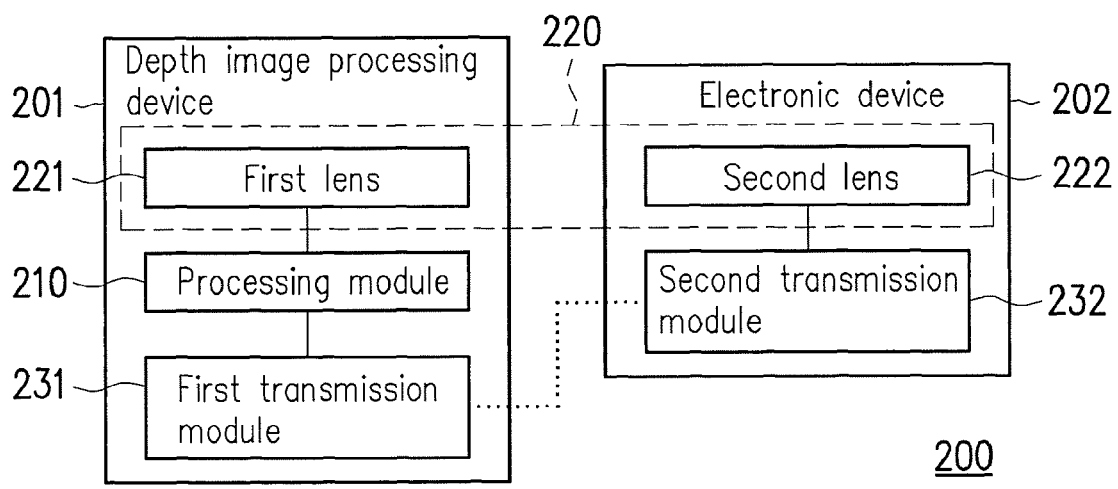
FIG. 2 is a block diagram of a depth image processing system according to another exemplary embodiment of the invention.

FIG. 2 is a block diagram of a depth image processing system according to another exemplary embodiment of the invention. Referring to FIG. 2, the depth image processing system 200 of the other exemplary embodiment of the invention includes a depth image processing device 201 and an electronic device 202. The depth image processing device 201 is, for example, a digital camera or other small image capturing device. The electronic device 202 is, for example, a smart phone, a tablet personal computer (PC) or other handheld electronic device having a camera function. The depth image processing device 201 and the electronic device 202 can be detachably coupled to each other through a first transmission module 231 and a second transmission module 232. The first transmission module 231 and the second transmission module 232 are, for example, respectively a universal serial bus (USB), a mini universal serial bus (mini USB), a micro universal serial bus (micro USB) or other transmission interface. The camera module 220 includes a first lens 221 and a second lens 222. The first lens 221 and the second lens 222 are, for example, CMOS image sensors or CCD image sensors. The second lens 222 can be a front lens or a back lens of the electronic device 202. When the user captures image data, the processing module 210 simultaneously receives a left image and a right image from the first lens 221 and the second lens 222 to produce a stereo depth image. For simplicity's sake, the processing module 110, the first lens 121 and the second lens 122 are taken as an example for descriptions hereinafter.

Figure 3:
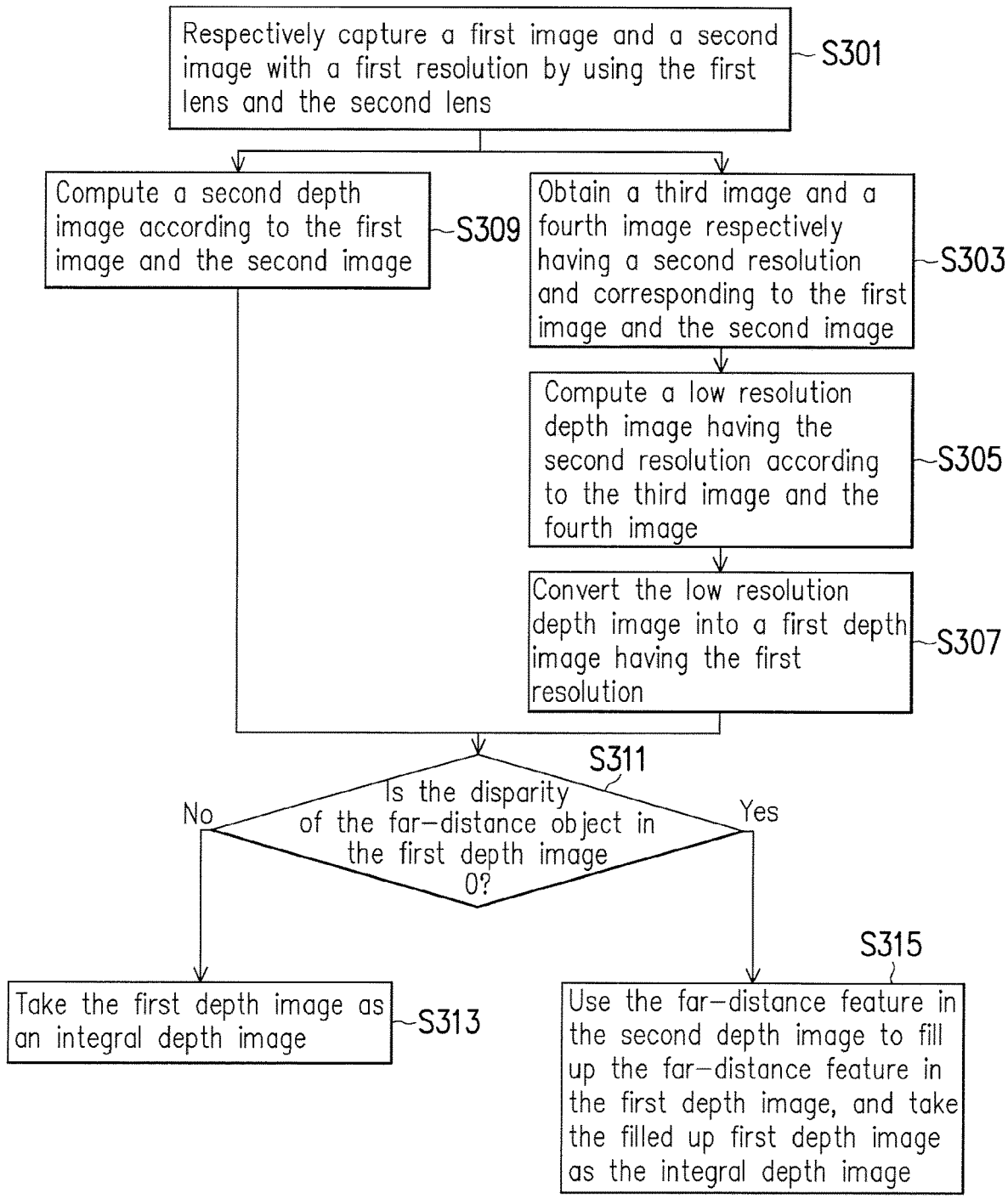
FIG. 3 is a flowchart illustrating a depth image processing method according to an exemplary embodiment of the invention.
Figure 4A:
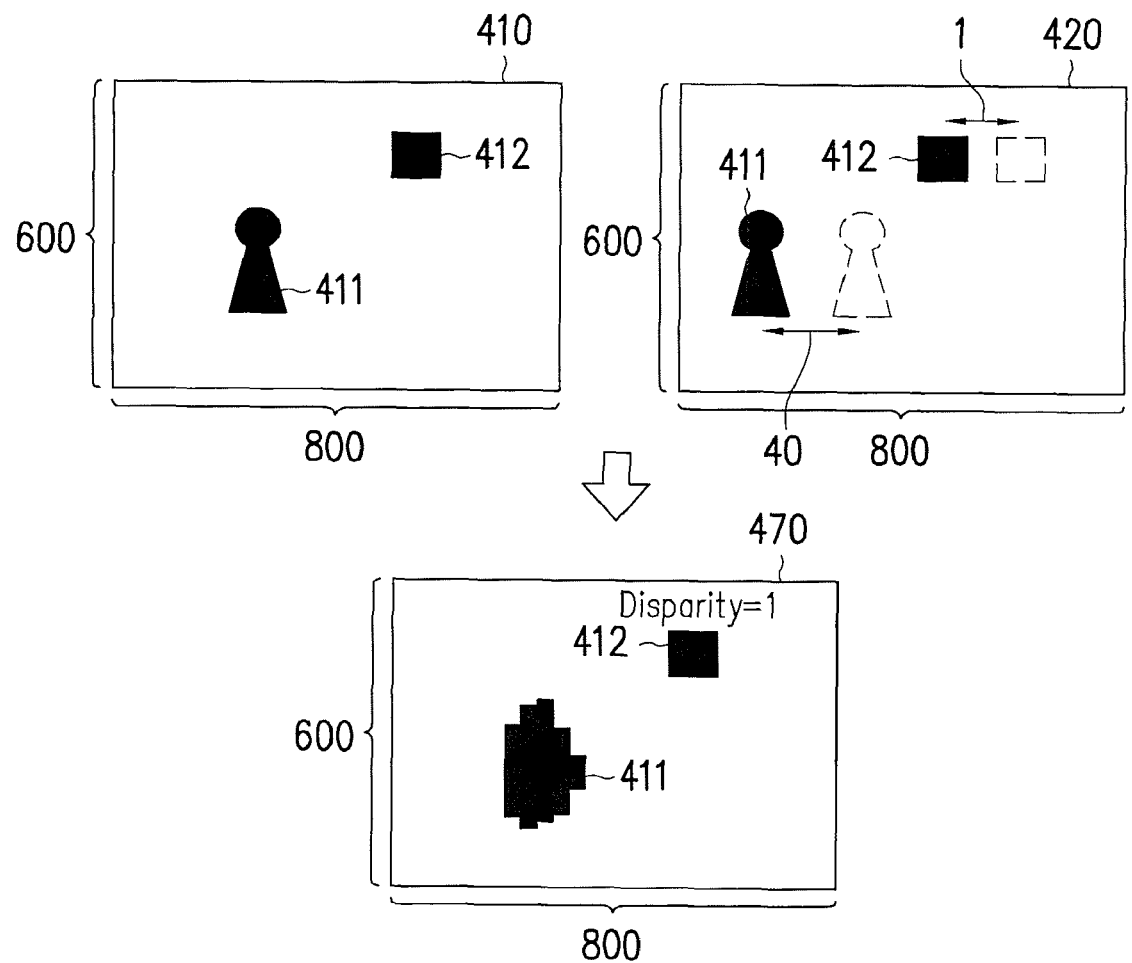
FIG. 4A to FIG. 4C are schematic diagrams of a depth image processing method according to an exemplary embodiment of the invention.
Figure 4B:
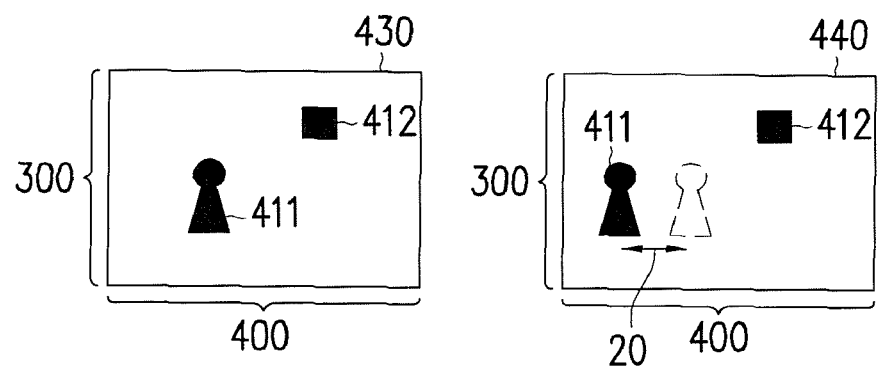
Figure 4C:
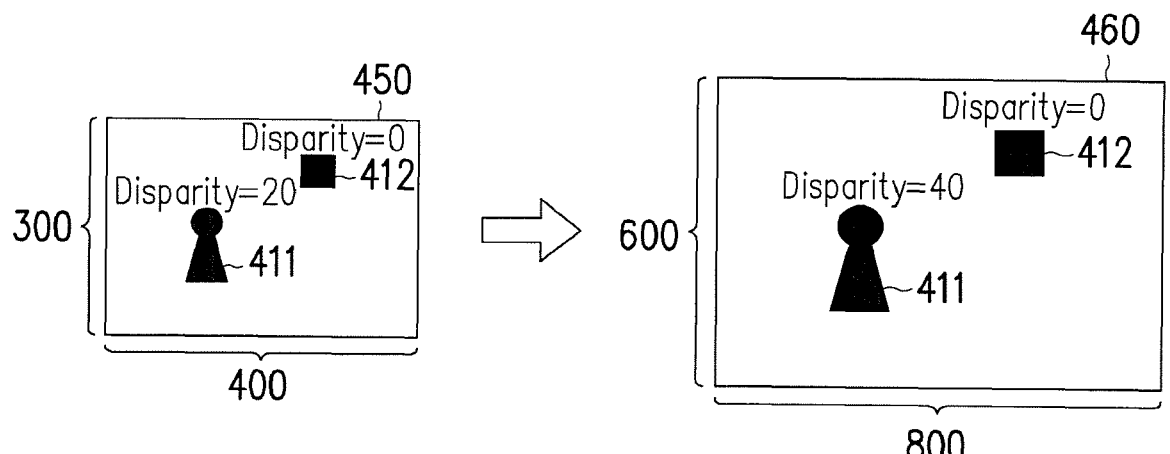

FIG. 3 is a flowchart illustrating a depth image processing method according to an exemplary embodiment of the invention. FIG. 4A to FIG. 4C are schematic diagrams of a depth image processing method according to an exemplary embodiment of the invention.

Referring to FIG. 3, in step S301, the camera module 120 respectively captures a first image 410 (or referred to as a left image) and a second image 420 (or referred to as a right image) with a first resolution by using the first lens 121 and the second lens 122. In FIG. 4A, the first image 410 and the second image 420 have the first resolution. For simplicity's sake, it is assumed that the first resolution is 800*600 in the present exemplary embodiment, though the invention is not limited thereto. In another exemplary embodiment, the first resolution can also be 1280*720, 1920*1080 or other resolutions. For simplicity's sake, it is assumed that there are one near-distance object 411 and a far-distance object 412 in at least one region of interest (ROI) corresponding to the first image 410 and the second image 420. A dash line portion of the second image 420 represents corresponding positions of the near-distance object 411 and the far-distance object 412 of the first image 410 in the second image 420. In the present exemplary embodiment, it is assumed that a disparity of the near-distance objects 411 in the first image 410 and the second image 420 is "40". The disparity "40" represents that a difference between horizontal positions of the near-distance objects 411 in the first image 410 and the second image 420 is 40 pixels, and a disparity of the far-distance object 412 is 1.

In step S303, the processing module 110 obtains a third image 430 and a fourth image 440 respectively having a second resolution and corresponding to the first image 410 and the second image 420. For example, in FIG. 4B, the processing module 110 computes the third image 430 corresponding to the first image 410 and the fourth image 440 corresponding to the second image 420, where the third image 430 and the fourth image 440 have the second resolution smaller than the first resolution. In the present exemplary embodiment, it is assumed that the second resolution is 400*300, though the invention is not limited thereto. In another exemplary embodiment, the second resolution can be any resolution smaller than the first resolution, for example, the second resolution is ¼, ¹⁄₁₆ of the first resolution, etc. Since resolutions of the third image 430 and the fourth image 440 along a horizontal axis and a vertical axis are all ½ of that of the first image 410 and the second image 420, in the third image 430 and the fourth image 440, the disparity of the near-distance object 411 is ½ of 40, i.e. 20, and the disparity of the far-distance object 412 becomes 0.

In step S305, the processing unit 110 computes a low resolution depth image 450 having the second resolution according to the third image 430 and the fourth image 440. In step S307, the processing unit 110 converts the low resolution depth image 450 into a first depth image 460 having the first resolution. To be specific, the depth image processing method of the present exemplary embodiment first sets a disparity threshold to compute a depth image according to the left image and the right image, and if a disparity of the objects in the left image and the right image is greater than the disparity threshold, the object in the depth image computed according to the left image and the right image presents a fractured pattern. For example, it is assumed that the disparity threshold in FIG. 4C is 30. When the processing module 110 computes the low resolution depth image 450 according to the third image 430 and the fourth image 440, the processing module 110 first determines a plurality of features in the fourth image 440, and searches corresponding features with similarities greater than the similarity threshold from the third image 430 within a range corresponding to 30 pixels to the right side of each feature position of the fourth image 440, so as to obtain a plurality of feature pairs between the third image 430 and the fourth image 440, and determines the near-distance object 411 and the far-distance object 412 according to disparities of the feature pairs, where the near-distance object 411 (or referred to as near-distance features) and the far-distance object 412 (or referred to as far-distance features) may include one or a plurality of feature pairs. In this way, the processing module 110 obtains the near-distance object 411 with the disparity of 20 and the far-distance object 412 with the disparity of 0 through the feature pairs, and computes the low resolution depth image 450. Then, the processing module 110 converts the low resolution depth image 450 with the resolution of 400*300 into the first depth image 460 with the resolution of 800*600. In the first depth image 460, the disparity of the near-distance object 411 is 40 and the disparity of the far-distance object 412 is 0.

It should be noted that the processing module 110 may further set a lower limit of comparison times (for example, 15) when computing the first depth image 460 to obtain the disparity of the near-distance object 411. To be specific, each time when the processing module 110 searches the feature pair, the processing module 110 is unnecessary to search the corresponding feature with similarity greater than the similarity threshold from the third image 430 within a range corresponding to 30 pixels to the right side of each feature position of the fourth image 440, but searches the corresponding feature with similarity greater than the similarity threshold from the third image 430 within a range corresponding to 15-30 pixels to the right side of each feature position of the fourth image 440, which may greatly decrease a computing time.

In step S309, the processing module 110 computes a second depth image 470 according to the first image 410 and the second image 420. For example, in FIG. 4A, since the disparity of the near-distance object 411 is 40, which is greater than the disparity threshold 30, the near-distance object 411 in the second depth image 470 presents a fractured state, and the far-distance object 412 in the second depth image 470 is normally presented, and the disparity thereof is 1.

In step S311, the processing module 110 determines whether the disparity of the far-distance object 412 in the first depth image 460 is 0. If the disparity of the far-distance object 412 in the first depth image 460 is not 0, in step S313, the processing module 110 takes the first depth image 460 as an integral depth image. If the disparity of the far-distance object 412 in the first depth image 460 is 0, in step S315, the processing module 110 uses the far-distance object 412 in the second depth image 470 to fill up the far-distance object 412 in the first depth image 460, and takes the filled up first depth image 460 as the integral depth image.

It should be noted that in the present exemplary embodiment, although the processing module 110 first computes the first depth image 460 and the second depth image 470, and then performs the comparison of the step S311, the invention is not limited thereto. For example, in another exemplary embodiment, the processing module 110 may not compute the second depth image 470 first, but computes the second depth image 470 only after determining that the disparity of the far-distance object 412 in the first depth image 460 is 0, and uses the far-distance object 412 in the second depth image 470 to fill up the far-distance object 412 in the first depth image 460, so as to save the computing time of the depth image processing method of the invention.

Figure 5:
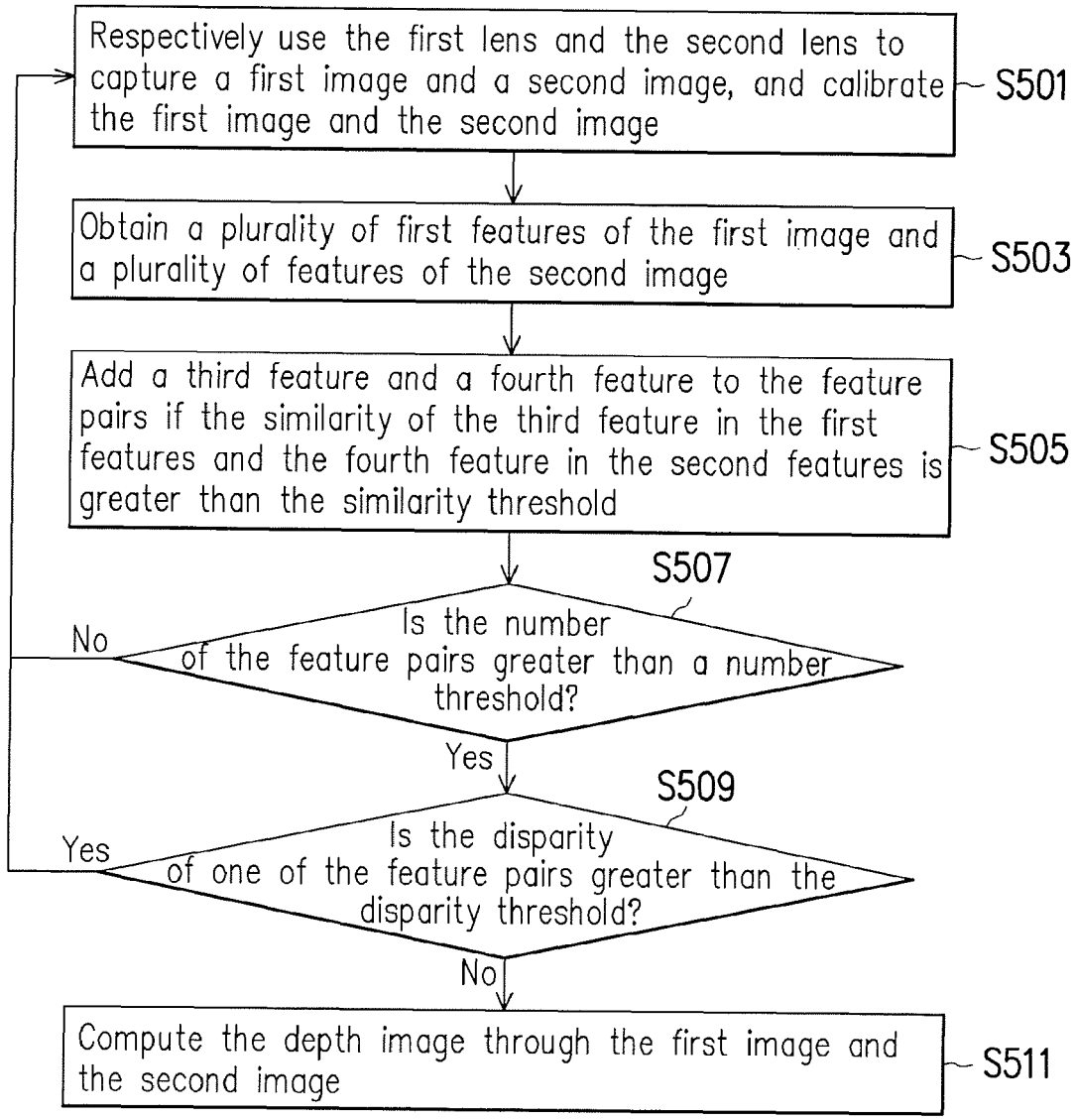
FIG. 5 is a flowchart illustrating a depth image processing method according to another exemplary embodiment of the invention.
Figure 6:
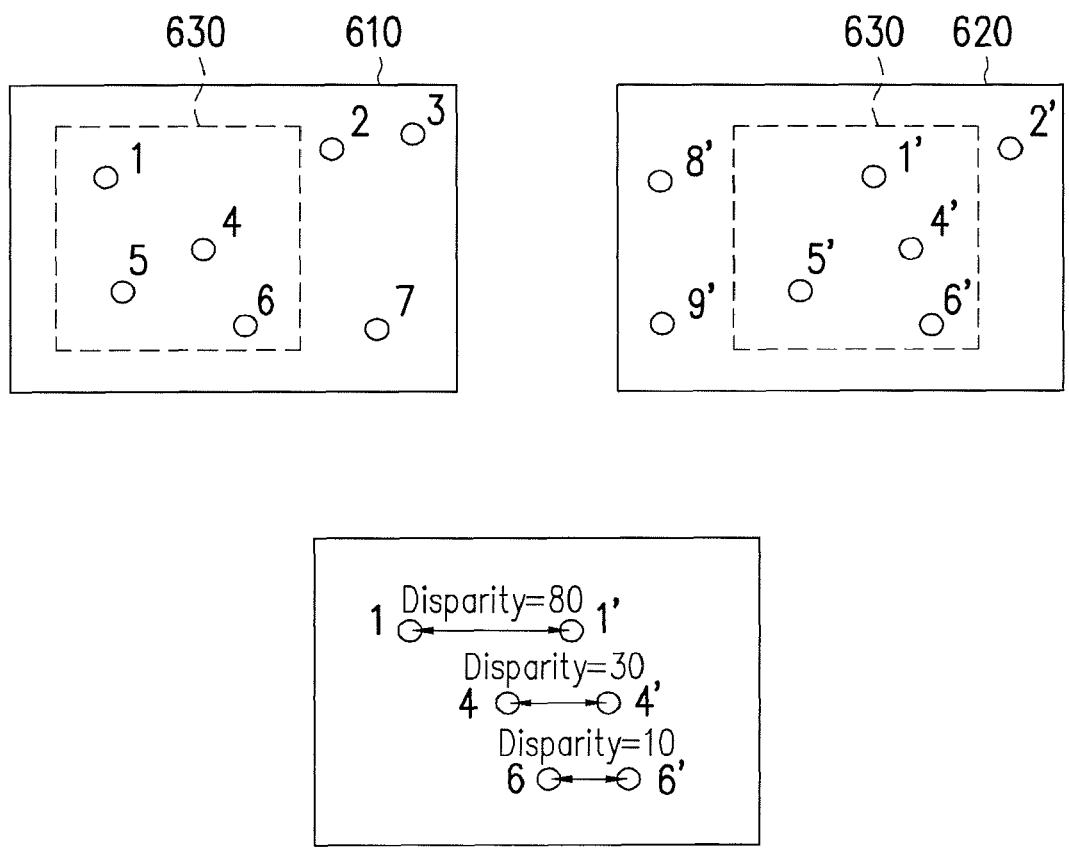
FIG. 6 is a schematic diagram of a depth image processing method according to another exemplary embodiment of the invention.

FIG. 5 is a flowchart illustrating a depth image processing method according to another exemplary embodiment of the invention. FIG. 6 is a schematic diagram of the depth image processing method according to another exemplary embodiment of the invention.

Referring to FIG. 5, in step S501, the camera module 120 respectively uses the first lens 121 and the second lens 122 to capture a first image 610 (or referred to as a left image) and a second image 620 (or referred to as a right image), and calibrates the first image 610 and the second image 620 to eliminate a rotation difference of X, Y, Z coordinate axes and a displacement difference of the Y, Z coordinate axes between the first image 610 and the second image 620, such that only the displacement difference of the X coordinate axis remains in the first image 610 and the second image 620. It should be noted that in the aforementioned description, although the first image and the second image are respectively the left image and the right image, the first image and the second image can also respectively be the right image and the left image.

In step S503, the processing module 110 obtains a plurality of first features of the first image 610 and a plurality of features of the second image 620, where the first features and the second features are corner points or points with color values and gray values largely different to that of the surrounding pixels in the images. In the present exemplary embodiment, a same searching range 630 (or ROI) is defined in the first image 610 and the second image 620, and first features 1, 4, 5, 6 and second features 1', 4', 5', 6' are respectively marked in the searching ranges 630. The searching range 630 can be a range selected by the user, a range of a human face in the image, or an auto focus range in an image capturing process.

In step S505, if the similarity of a third feature in the first features and a fourth feature in the second features is greater than the similarity threshold, the processing module 110 adds the third feature and the fourth feature into the feature pairs. For example, in FIG. 6, it is assumed that similarities of 1, 4, 6 in the first features and 1', 4', 6' in the second features are greater than the similarity threshold, 1-1', 4-4' and 6-6' are added into the feature pairs.

In step S507, the processing module 110 determines whether the number of the feature pairs is greater than a number threshold. To be specific, in the present exemplary embodiment, the processing module 110 sets the number threshold to a specific percentage of a total number of the first features or the second features, for example, if the total number of the first features is 1000 and the total number of the second features is 900, the number threshold can be set to 30% of the total number of the second features, i.e. 270. If the number of the feature pairs is not greater than the number threshold, the flow returns to the step S501 to re-capture the first image 610 and the second image 620.

If the number of the feature pairs is greater than the number threshold, in step S509, the processing module 110 further determines whether the disparity of one of the feature pairs is greater than the disparity threshold. If the disparity of one of the feature pairs is greater than the disparity threshold, the processing module 110 does not compute the depth image through the first image 610 and the second image 620 and sends a warning signal. Then, the flow returns to the step S501 to re-capture the first image 610 and the second image 620. For example, in FIG. 6, it is assumed that the disparity threshold is 30, since a disparity of the feature pair 1-1' is 80, which is greater than the disparity threshold 30, the depth image calculated under such condition may present a fractured state, so that the system may automatically send the warning signal to notify the user that a capturing distance is too close.

If the disparities of all of the feature pairs are not greater than the disparity threshold, in step S511, the processing module 110 computes the depth image through the first image 610 and the second image 620.

It should be noted that in the present exemplary embodiment, when the disparity of one of the feature pairs is greater than the disparity threshold, it is determined that the capturing distance is too close and the depth image is not produced, though the invention is not limited thereto. For example, in another exemplary embodiment, only when disparities of a predetermined proportion of the feature pairs are greater than the disparity threshold, it is determined that the capturing distance is too close and the depth image is not produced.

Moreover, since the depth image processing method of the invention may search excessively close capturing targets from a search range i.e. capturing targets, if other object exists in a closer place, even if a depth image of such object exceeds the disparity threshold to present a fractured pattern, since such object is not a capturing target, the system does not send the warning signal to remind the user.

In summary, the depth image processing method and the depth image processing system of the invention first decrease a resolution of the left image and the right image to obtain the first depth image, and obtain the second depth image by using the left image and the right image of the original resolution, and fill up the far-distance object of the second depth image into the first depth image. In this way, a computing time of the depth image is shortened while details of the far-distance object in the depth image are maintained. Moreover, the depth image processing method and the depth image processing system of the invention may further send a warning signal to the user to remind the user that a capturing distance is too close when the disparity of the feature pairs with high similarity is greater than the disparity threshold, such that the user is avoided to waste a long time to wait for producing a depth image with fractured object.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A depth image processing method, comprising:
    capturing a first image and a second image;
    performing a feature comparison to obtain one or more feature pairs between the first image and the second image, wherein each of the one or more feature pairs comprises a feature in the first image and a corresponding feature in the second image;
    computing disparities of the one or more feature pairs; and
    computing a depth image through the first image and the second image when the disparities of the one or more feature pairs are all smaller than a disparity threshold.

2. The depth image processing method as claimed in claim 1, wherein the one or more feature pairs are obtained from at least one region of interest corresponding to the first image and the second image.

3. The depth image processing method as claimed in claim 1, further comprising:
    computing a third image corresponding to the first image and a fourth image corresponding to the second image, wherein the first image and the second image have a first resolution, the third image and the fourth image have a second resolution, and the second resolution is smaller than the first resolution; and
    performing the feature comparison on the third image and the fourth image to obtain a first depth image, wherein the first depth image comprises a near-distance feature and a far-distance feature, wherein a disparity of the near-distance feature is greater than a lower limit of comparison times.

4. The depth image processing method as claimed in claim 3, wherein the step of performing the feature comparison on the third image and the fourth image to obtain the first depth image comprises:
    performing the feature comparison on the third image and the fourth image to obtain a low resolution depth image, and obtaining the first depth image having the first resolution through the low resolution depth image.

5. The depth image processing method as claimed in claim 3, wherein the step of performing the feature comparison to obtain the one or more feature pairs between the first image and the second image comprises:
    performing the feature comparison within the disparity threshold to obtain the far-distance feature of the first image and the second image, and computing a second depth image through the first image and the second image.

6. The depth image processing method as claimed in claim 5, further comprising:
    using the far-distance feature of the second depth image to fill up the far-distance feature of the first depth image when a disparity of the far-distance feature of the first depth image is equal to zero.

7. The depth image processing method as claimed in claim 1, wherein the step of performing the feature comparison to obtain the one or more feature pairs between the first image and the second image comprises:
    obtaining a plurality of first features of the first image and a plurality of second features of the second image;
    adding a third feature and a fourth feature to the one or more feature pairs when similarity of the third feature in the first features and the fourth feature in the second features is greater than a similarity threshold;
    determining whether the disparities of the one or more feature pairs are greater than the disparity threshold when the number of the one or more feature pairs is greater than a number threshold; and
    not computing the depth image through the first image and the second image and sending a warning signal when the disparities of a predetermined proportion of the one or more feature pairs are greater than the disparity threshold.

8. The depth image processing method as claimed in claim 7, further comprising:
    computing similarity of the third feature and the fourth feature by comparing a plurality of feature vectors of the third feature and the fourth feature.

9. The depth image processing method as claimed in claim 1, wherein the step of capturing the first image and the second image comprising:
    calibrating the first image and the second image to eliminate a rotation difference of a plurality of coordinate axes and a displacement difference of a part of the coordinate axes between the first image and the second image.

10. A depth image processing system, comprising:
- a camera module, comprising a first lens and a second lens, wherein the first lens is configured to capture a first image and the second lens is configured to capture a second image; and
- a processor, coupled to the camera module, and performing a feature comparison to obtain one or more feature pairs between the first image and the second image, and computing disparities of the one or more feature pairs, and computing a depth image through the first image and the second image when the disparities of the one or more feature pairs are all smaller than a disparity threshold, wherein each of the one or more feature pairs comprises a feature in the first image and a corresponding feature in the second image.

11. The depth image processing system as claimed in claim 10, wherein the one or more feature pairs are obtained from at least one region of interest of the first image and the second image.

12. The depth image processing system as claimed in claim 10, wherein the processor computes a third image corresponding to the first image and a fourth image corresponding to the second image, wherein the first image and the second image have a first resolution, the third image and the fourth image have a second resolution, and the second resolution is smaller than the first resolution; and
- wherein the processor performs the feature comparison on the third image and the fourth image to obtain a first depth image, wherein the first depth image comprises a near-distance feature and a far-distance feature, wherein a disparity of the near-distance feature is greater than a lower limit of comparison times.

13. The depth image processing system as claimed in claim 12, wherein the processor performs the feature comparison on the third image and the fourth image to obtain a low resolution depth image, and obtains the first depth image having the first resolution through the low resolution depth image.

14. The depth image processing system as claimed in claim 12, wherein the processor performs the feature comparison within the disparity threshold to obtain the far-distance feature of the first image and the second image, and computes a second depth image through the first image and the second image.

15. The depth image processing system as claimed in claim 14, wherein the processor uses the far-distance feature of the second depth image to fill up the far-distance feature of the first depth image when a disparity of the far-distance feature of the first depth image is equal to zero.

16. The depth image processing system as claimed in claim 10, wherein
- the processor obtains a plurality of first features of the first image and a plurality of second features of the second image,
- when similarity of a third feature in the first features and a fourth feature in the second features is greater than a similarity threshold, the processor adds the third feature and the fourth feature to the one or more feature pairs,
- when the number of the one or more feature pairs is greater than a number threshold, the processor determines whether the disparities of the one or more feature pairs are greater than the disparity threshold,
- when the disparities of a predetermined proportion of the one or more feature pairs are greater than the disparity threshold, the processor does not compute the depth image through the first image and the second image and sends a warning signal.

17. The depth image processing system as claimed in claim 16, wherein the processor computes similarity of the third feature and the fourth feature by comparing a plurality of feature vectors of the third feature and the fourth feature.

18. The depth image processing system as claimed in claim 10, wherein the processor calibrates the first image and the second image to eliminate a rotation difference of a plurality of coordinate axes and a displacement difference of a part of the coordinate axes between the first image and the second image.

19. The depth image processing system as claimed in claim 10, wherein the depth image processing system is an image capturing device.

20. The depth image processing system as claimed in claim 10, further comprises a depth image processing device and an electronic device, wherein the first lens is disposed in the depth image processing device, and the second lens is disposed in the electronic device, wherein the depth image processing device is detachably disposed on the electronic device.

* * * * *